(12) United States Patent
Wang

(10) Patent No.: US 11,151,773 B2
(45) Date of Patent: Oct. 19, 2021

(54) METHOD AND APPARATUS FOR ADJUSTING VIEWING ANGLE IN VIRTUAL ENVIRONMENT, AND READABLE STORAGE MEDIUM

(71) Applicant: TENCENT TECHNOLOGY (SHENZHEN) COMPANY LIMITED, Shenzhen (CN)

(72) Inventor: Han Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/937,332

(22) Filed: Jul. 23, 2020

(65) Prior Publication Data

US 2020/0357163 A1     Nov. 12, 2020

Related U.S. Application Data

(63) Continuation of application No. PCT/CN2019/078756, filed on Mar. 19, 2019.

(30) Foreign Application Priority Data

Apr. 16, 2018 (CN) .......................... 201810339749.7

(51) Int. Cl.
*G06T 15/20* (2011.01)
*A63F 13/5255* (2014.01)
(Continued)

(52) U.S. Cl.
CPC .......... *G06T 15/20* (2013.01); *A63F 13/5255* (2014.09); *G06F 3/04815* (2013.01);
(Continued)

(58) Field of Classification Search
None
See application file for complete search history.

(56) References Cited

U.S. PATENT DOCUMENTS 6,664,986 B1 *  12/2003  Kopelman ........... A61C 9/0046
                                                   715/849
2010/0060661 A1 *  3/2010  Avent .................. A63F 13/5258
                                                   345/619
(Continued)

FOREIGN PATENT DOCUMENTS

CN   102414641 A   4/2012
CN   104436657 A   3/2015
(Continued)

OTHER PUBLICATIONS

International Search Report for PCT Patent Application No. PCT/CN2019/078756.

*Primary Examiner* — Frank S Chen

(57) ABSTRACT

This disclosure discloses a method and an apparatus for adjusting a viewing angle in a virtual environment. The method includes: displaying a first viewing angle picture, the first viewing angle picture including a virtual object having a first orientation; receiving a drag instruction for a viewing angle adjustment control; adjusting the first viewing angle direction according to the drag instruction, to obtain a second viewing angle direction; and displaying a second viewing angle picture, the second viewing angle picture including the virtual object having the first orientation.

19 Claims, 11 Drawing Sheets

(51) Int. Cl.
  *G06F 3/0481* (2013.01)
  *A63F 13/55* (2014.01)
  *A63F 13/822* (2014.01)
  *A63F 13/837* (2014.01)
  *G09B 9/00* (2006.01)
  *G09B 29/00* (2006.01)

(52) U.S. Cl.
  CPC ............ *A63F 13/55* (2014.09); *A63F 13/822* (2014.09); *A63F 13/837* (2014.09); *A63F 2300/6676* (2013.01); *A63F 2300/807* (2013.01); *A63F 2300/8076* (2013.01); *G06T 2200/24* (2013.01); *G09B 9/003* (2013.01); *G09B 29/003* (2013.01)

(56) References Cited

U.S. PATENT DOCUMENTS

| | | | | |
|---|---|---|---|---|
| 2018/0082117 A1* | 3/2018 | Sharma | | G06T 19/006 |
| 2018/0143023 A1* | 5/2018 | Bjorke | | G06T 19/003 |
| 2018/0160049 A1* | 6/2018 | Aizawa | | H04N 5/247 |
| 2019/0118078 A1* | 4/2019 | Li | | G06F 3/04883 |

FOREIGN PATENT DOCUMENTS

| | | | |
|---|---|---|---|
| CN | 104765905 | A | 7/2015 |
| CN | 106774907 | A | 5/2017 |
| CN | 106959812 | A | 7/2017 |
| CN | 107519641 | A | 12/2017 |
| CN | 107803024 | A | 3/2018 |
| CN | 108499105 | A | 9/2018 |
| EP | 2921938 | | 9/2015 |

\* cited by examiner

METHOD AND APPARATUS FOR ADJUSTING VIEWING ANGLE IN VIRTUAL ENVIRONMENT, AND READABLE STORAGE MEDIUM

RELATED APPLICATION

This application is a continuation application of PCT Patent Application No. PCT/CN2019/078756, filed on Mar. 19, 2019, which claims priority to Chinese Patent Application No. 201810339749.7, filed on Apr. 16, 2018 and entitled "METHOD AND APPARATUS FOR ADJUSTING VIEWING ANGLE IN VIRTUAL ENVIRONMENT, AND STORAGE MEDIUM", wherein the entirety of each of the above-referenced applications is incorporated herein by reference in its entirety.

FIELD OF THE TECHNOLOGY

Embodiments of this disclosure relate to the field of computer graphics processing, and in particular, to a method and an apparatus for adjusting a viewing angle in a virtual environment, and a readable storage medium.

BACKGROUND OF THE DISCLOSURE

In an application program having a virtual environment, for example, a virtual reality application program, a third-person shooting (TPS) game, a first-person shooting (FPS) game, or a multiplayer online battle arena (MOBA) game, an effect of a display element such as a virtual object or the ground is achieved using a three-dimensional model. A user may rotate a viewing angle of a virtual object in a virtual environment through a drag operation.

Generally, in a user interface of the foregoing application program, the user may control the virtual object by controlling a joystick control with the left hand and sliding on the right screen. The joystick control is configured to control the virtual object to move forward, backward, left or right without changing an orientation, and rotate a direction that the virtual object faces in the virtual environment (that is, a viewing angle direction) on the right screen.

However, when the viewing angle of the virtual object is rotated in the foregoing manner, a state of the virtual object is also changed. That is, in the process of rotating the viewing angle, a model of the virtual object also needs to be rotated simultaneously in the virtual environment, namely, an orientation of the virtual object is also rotated. When the virtual object is in a walking or running state, rotating the viewing angle changes a direction in which the virtual object walks or runs, resulting in inconvenience to operations of the user when the user observes the virtual environment.

SUMMARY

Embodiments of this disclosure provide a method and an apparatus for adjusting a viewing angle in a virtual environment, and a readable storage medium, to resolve a problem that adjusting a viewing angle changes a direction in which a virtual object walks or runs and various operations affect each other. The technical solutions are as follows:

According to an aspect, a method for adjusting a viewing angle in a virtual environment is provided. The method is applied to a terminal and includes:

displaying a first viewing angle picture, the first viewing angle picture being a picture of observing a virtual object in a first viewing angle direction in the virtual environment, the first viewing angle picture including the virtual object having a first orientation, and a viewing angle adjustment control being overlay-displayed on the first viewing angle picture;

receiving a drag instruction for the viewing angle adjustment control;

adjusting the first viewing angle direction according to the drag instruction, to obtain a second viewing angle direction; and displaying a second viewing angle picture, the second viewing angle picture being a picture of observing the virtual object in the second viewing angle direction in the virtual environment, and the second viewing angle picture including the virtual object having the first orientation.

According to another aspect, an apparatus for adjusting a viewing angle in a virtual environment is provided. The apparatus includes a memory operable to store program code and a processor operable to read the program code. The processor is configured to:

display a first viewing angle picture, the first viewing angle picture being a picture of observing a virtual object in a first viewing angle direction in the virtual environment, the first viewing angle picture including the virtual object having a first orientation, and a viewing angle adjustment control being overlay-displayed on the first viewing angle picture;

receive a drag instruction for the viewing angle adjustment control;

adjust the first viewing angle direction according to the drag instruction, to obtain a second viewing angle direction; and display a second viewing angle picture, the second viewing angle picture being a picture of observing the virtual object in the second viewing angle direction in the virtual environment, and the second viewing angle picture including the virtual object having the first orientation.

According to another aspect, a terminal is provided, including a processor and a memory storing at least one instruction, at least one program, a code set, or an instruction set, the at least one instruction, the at least one program, the code set, or the instruction set being loaded and executed by the processor to implement the method for adjusting a viewing angle in a virtual environment in the foregoing embodiment of this disclosure.

According to another aspect, a non-transitory machine-readable media is provided, having machine-readable instructions for adjusting a viewing angle in a virtual environment. The machine-readable instructions are configured to, when executed, cause a machine to:

display a first viewing angle picture, the first viewing angle picture being a picture of observing a virtual object in a first viewing angle direction in the virtual environment, the first viewing angle picture comprising the virtual object having a first orientation, and a viewing angle adjustment control being overlay-displayed on the first viewing angle picture;

receive a drag instruction for the viewing angle adjustment control;

adjust the first viewing angle direction according to the drag instruction, to obtain a second viewing angle direction; and display a second viewing angle picture, the second viewing angle picture being a picture observing the virtual object in the second viewing angle direction in the virtual environment, and the second viewing angle picture comprising the virtual object having the first orientation.

According to another aspect, a computer program product is provided, the computer program product, when being run on a computer, causing the computer to perform the method for adjusting a viewing angle in a virtual environment in the foregoing embodiment of this disclosure.

Beneficial effects brought by the technical solutions provided in the embodiments of this disclosure are at least as follows:

By setting a viewing angle adjustment control, when a user controls the viewing angle adjustment control on a first user interface, a viewing angle direction in which a virtual environment is observed may be adjusted without changing an orientation of a virtual object, that is, while the virtual object maintains an original character orientation and an original movement posture, the user may observe other viewing angle directions of the virtual environment by controlling the viewing angle adjustment control. In other words, a travel direction of the virtual object in the virtual environment will not change because the user observes other viewing angle directions, thereby improving convenience of observing the virtual environment for the user, and avoiding mutual influence between a viewing angle adjustment operation and a movement track of the virtual object.

DESCRIPTION OF EMBODIMENTS

Figure 1:
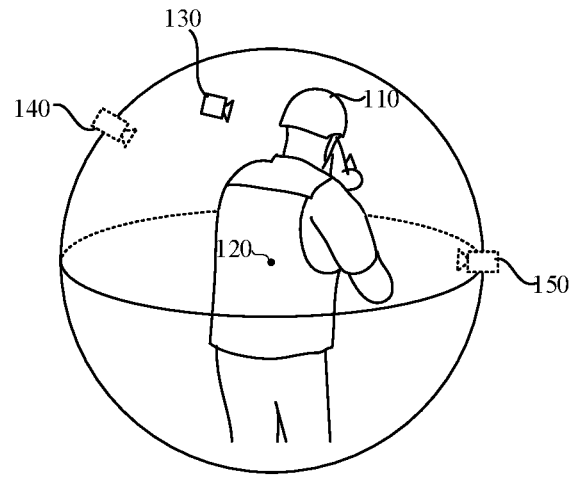
FIG. 1 is a schematic diagram of a camera model according to an exemplary embodiment of this disclosure.

To make the objectives, technical solutions, and advantages of this disclosure clearer, the following further describes implementations of this disclosure in detail with reference to the accompanying drawings.

First, terms described in the embodiments of this disclosure are briefly introduced.

Virtual environment: a virtual environment displayed (or provided) by an application program when run on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment, description is made using an example in which the virtual environment is a three-dimensional virtual environment in the following embodiment, but this is not limited. Optionally, the virtual environment is further used for a virtual environment battle between at least two virtual roles.

Virtual object: a movable object in a virtual environment. The movable object includes at least one of a virtual character, a virtual animal, and a cartoon character. Optionally, when the virtual environment is a three-dimensional virtual environment, the virtual object is a three-dimensional model created based on a skeletal animation technology. Each virtual object has a shape and a volume in the three-dimensional virtual environment, and occupies some space in the three-dimensional virtual environment.

Viewing angle direction: an observation direction in a case that observation is performed from a first-person viewing angle or a third-person viewing angle of a virtual object in a virtual environment. Optionally, in the embodiments of this disclosure, the viewing angle direction refers to a direction in a case that a virtual object is observed from a third-person viewing angle in a virtual environment. Optionally, the viewing angle direction is a direction in a case that a virtual object is observed through a camera model in a virtual environment.

Camera model: a model located around a virtual object in a virtual environment. When a first-person viewing angle is used, the camera model is located near the head of the virtual object or at the head of the virtual object. When a third-person viewing angle is used, the camera model may be located behind the virtual object and bound to the virtual object, or may be located at any position away from the virtual object by a predetermined distance. The virtual object located in the virtual environment may be observed from different angles through the camera model. Optionally, when the third-person viewing angle is a first-person over-shoulder viewing angle, the camera model is located behind the virtual object (for example, the head and the shoulders of the virtual character). Optionally, the camera model automatically follows the virtual object in the virtual environment. That is, when a position of the virtual object in the virtual environment changes, a position of the camera model following the virtual object in the virtual environment changes simultaneously, and the camera model is always within a predetermined distance range of the virtual object in the virtual environment. Optionally, the camera model is not actually displayed in the virtual environment, that is, the camera model cannot be recognized in the virtual environment displayed in the user interface.

Description is made using an example in which the camera model is located at any position away from the virtual object by a predetermined distance. Optionally, one virtual object corresponds to one camera model, and the camera model may rotate with the virtual object as a rotation center, for example, the camera model is rotated with any point of the virtual object as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual object may be the head or the torso of the virtual object, or any point around the virtual object. This is not limited in the embodiments of this disclosure. Optionally, when the camera model observes the virtual object, the viewing angle direction of the camera model is a direction in which a vertical line on a tangent plane of a spherical surface on which the camera model is located points to the virtual object.

Optionally, the camera model may alternatively observe the virtual object at a predetermined angle in different directions of the virtual object.

For example, referring to FIG. 1, a point in a virtual object 110 is determined as a rotation center 120, and the camera model rotates around the rotation center 120. Optionally, the camera model is configured with an initial position, and the initial position is a position above and behind the virtual object (for example, a position behind the brain). For example, as shown in FIG. 1, the initial position is a position 13, and when the camera model rotates to a position 140 or a position 150, a viewing angle direction of the camera model changes as the camera model rotates.

Figure 2:
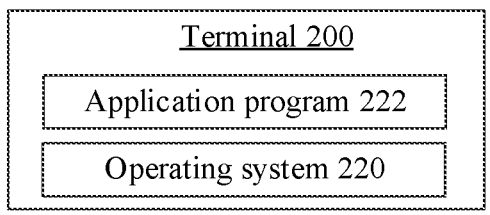
FIG. 2 is a structural block diagram of an electronic device according to an exemplary embodiment of this disclosure.

FIG. 2 is a structural block diagram of an electronic device according to an exemplary embodiment of this disclosure. The electronic device 200 includes: an operating system 220 and an application program 222.

The operating system 220 is basic software provided for the application program 222 to perform secure access to computer hardware.

The application program 222 is an application program supporting a virtual environment. Optionally, the application program 222 is an application program supporting a three-dimensional virtual environment. The application program 222 may be any one of a virtual reality application program, a three-dimensional map program, a military simulation program, a third-person shooting (TPS) game, a first-person shooting (FPS) game, an MOBA game, and a multiplayer shooting survival game. The application program 222 may be a standalone application program, such as a standalone 3D game program.

Figure 3:
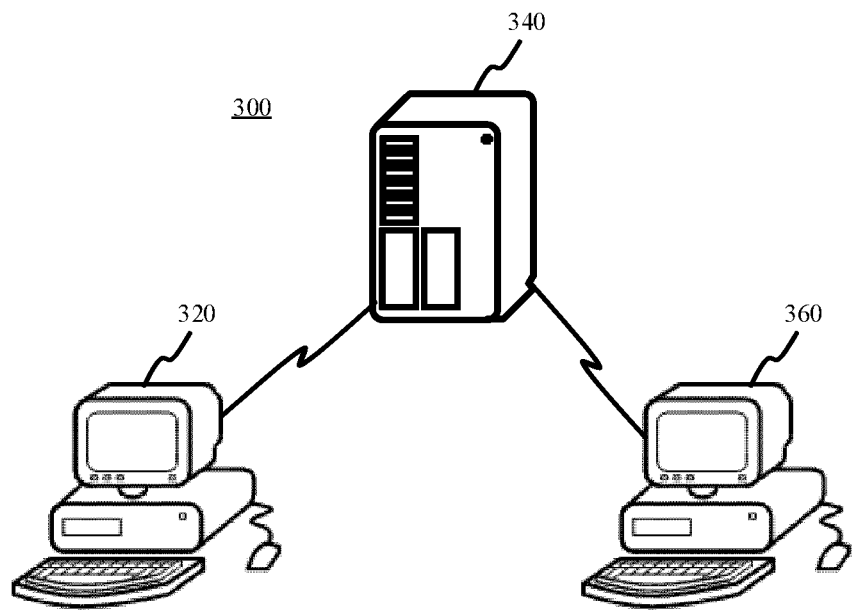
FIG. 3 is a structural block diagram of a computer system according to an exemplary embodiment of this disclosure.

FIG. 3 is a structural block diagram of a computer system according to an exemplary embodiment of this disclosure. The computer system 300 includes a first device 320, a server 340, and a second device 360.

An application program supporting a virtual environment is installed and run on the first device 320. The application program may be any one of a virtual reality application program, a three-dimensional map program, a military simulation program, a TPS game, an FPS game, an MOBA game, and a multiplayer shooting survival game. The first device 320 is a device used by a first user, the first user uses the first device 320 to control a first virtual object in the virtual environment to perform a movement, and the movement includes, but is not limited to, at least one of body posture adjustment, crawling, walking, running, cycling, jumping, driving, picking, shooting, attacking, and throwing. For example, the first virtual object is a first virtual character, such as a simulated character role or a cartoon character role.

The first device 320 is connected to the server 340 using a wireless network or a wired network.

The server 340 includes at least one of one server, a plurality of servers, a cloud computing platform, and a virtualization center. The server 340 is configured to provide background services for the application program supporting a three-dimensional virtual environment. Optionally, the server 340 takes on primary computing work, the first device 320 and the second device 360 take on secondary computing work; alternatively, the server 340 takes on the secondary computing work, and the first device 320 and the second device 360 take on the primary computing work; alternatively, collaborative computing is performed using a distributed computing architecture among the server 340, the first device 320, and the second device 360.

An application program supporting a virtual environment is installed and run on the second device 360. The application program may be any one of a virtual reality application program, a three-dimensional map program, a military simulation program, an FPS game, an MOBA game, and a multiplayer shooting survival game. The second device 360 is a device used by a second user, the second user uses the second device 360 to control a second virtual object in the virtual environment to perform a movement, and the movement includes, but is not limited to, at least one of body posture adjustment, crawling, walking, running, cycling, jumping, driving, picking, shooting, attacking, and throwing. For example, the second virtual object is a second virtual character, such as a simulated character role or a cartoon character role.

Optionally, the first virtual character and the second virtual character are located in the same virtual environment. Optionally, the first virtual character and the second virtual character may belong to the same team or the same organization, have a friend relationship, or have a temporary communication permission. Optionally, the first virtual character and the second virtual character may alternatively belong to different teams, different organizations, or two groups hostile to each other.

Optionally, the application programs installed on the first device 320 and the second device 360 are the same, or the application programs installed on the two devices are the same type of application programs of different control system platforms. The first device 320 may generally refer to one of a plurality of devices, the second device 360 may generally refer to one of a plurality of devices, and in this embodiment, description is made using only the first device 320 and the second device 360 as an example. Device types of the first device 320 and the second device 360 are the same or different. The device type includes at least one of a game console, a desktop computer, a smartphone, a tablet computer, an ebook reader, an MP3 player, an MP4 player, and a laptop computer. The following embodiments are described using an example in which the device is a desktop computer.

Those skilled in the art may learn that a quantity of the foregoing device may be more or less. For example, the quantity of the foregoing device may be only one, or may be dozens or hundreds, or may be more. The quantity of the device and the device type are not limited in the embodiments of this disclosure.

Figure 4:
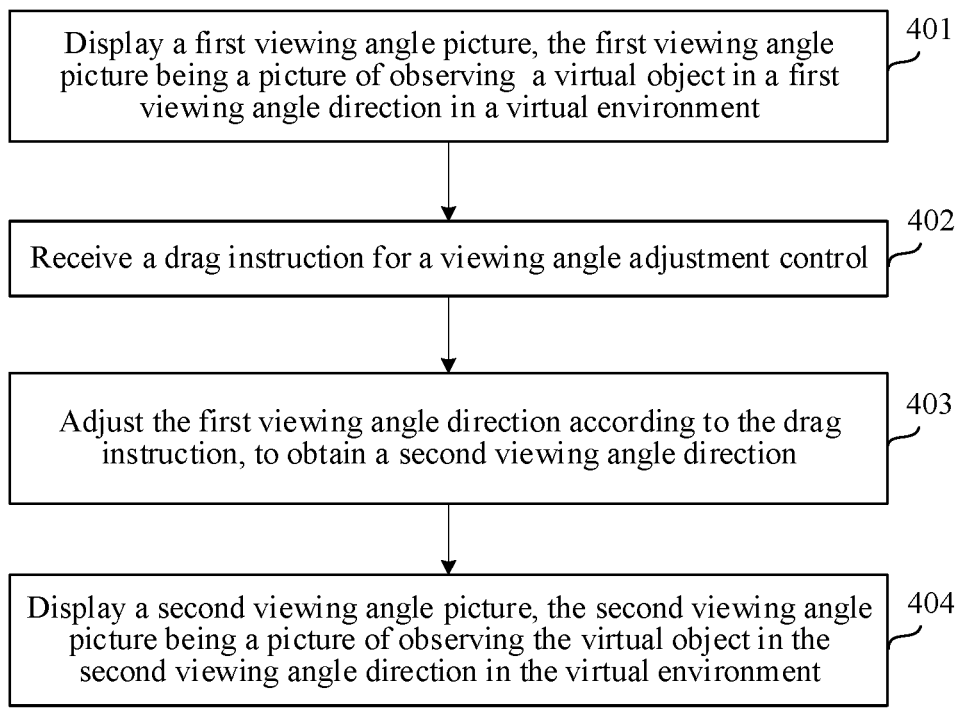
FIG. 4 is a flowchart of a method for adjusting a viewing angle in a virtual environment according to an exemplary embodiment of this disclosure.

A method for adjusting a viewing angle in a virtual environment provided in the embodiments of this disclosure is described with reference to the foregoing explanations of terms. FIG. 4 is a flowchart of a method for adjusting a viewing angle in a virtual environment according to an exemplary embodiment of this disclosure, and the method may be applied to a terminal or a server. In this embodiment, description is made using an example in which the method is applied to a terminal. The method for adjusting a viewing angle in a virtual environment includes the following steps:

Step 401. Display a first viewing angle picture, the first viewing angle picture being a picture of observing a virtual object in a first viewing angle direction in the virtual environment.

Optionally, the first viewing angle picture includes the virtual object having a first orientation, and a viewing angle adjustment control is further overlay-displayed on the first viewing angle picture.

Optionally, an application program is installed on the terminal. The application program is an application program supporting the virtual environment. Optionally, the application program may be a virtual reality application program, a TPS game, an FPS game, or an MOBA game, and the first viewing angle picture is a picture in a case that a virtual object is observed in a first viewing angle direction in the virtual environment of the application program.

Optionally, the first viewing angle direction may be an initial viewing angle direction when the virtual object is observed in the virtual environment. Optionally, the first viewing angle direction is a viewing angle direction when the virtual object is observed from behind the virtual object.

Optionally, that the viewing angle adjustment control is overlay-displayed on the first viewing angle picture means that the viewing angle adjustment control is located above the first viewing angle picture in the user interface, and the first viewing angle picture is located below the viewing angle adjustment control. When the first viewing angle picture changes in the user interface, a position or size of the viewing angle adjustment control in the user interface will not be affected. After the user changes the size or position of the viewing angle adjustment control in a setting interface, the display of the first viewing angle picture in the user interface will not be affected either.

Figure 5:
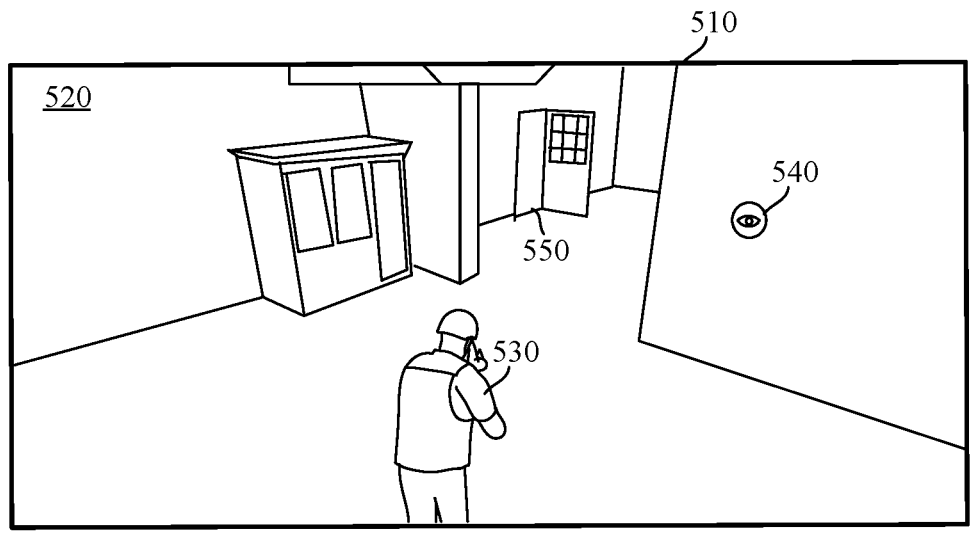
FIG. 5 is a schematic diagram of a user interface according to the embodiment shown in FIG. 4.

For example, referring to FIG. 5, a first viewing angle picture 520 is displayed in a user interface 510, the first viewing angle picture includes a virtual object 530 having a first orientation, the first orientation of the virtual object 530 is facing a doorway 550 in the virtual environment, and a viewing angle adjustment control 540 is further overlay-displayed on the first viewing angle picture.

Step 402. Receive a drag instruction for the viewing angle adjustment control.

Optionally, when the terminal is a mobile phone or a tablet having a touch display screen, the drag instruction may be generated by the user by touching and dragging the viewing angle adjustment control; and when the terminal is a desktop computer or a portable laptop computer, the drag operation may be generated by the user by dragging the viewing angle adjustment control through an external input device, for example, by the user by clicking and dragging the viewing angle adjustment control through a mouse.

Optionally, the viewing angle adjustment control is a control overlay-displayed on the viewing angle picture. Description is made using an example in which the terminal is a mobile phone or a tablet having a touch display screen, and a method for dragging the viewing angle adjustment control includes at least one of the following methods:

first, the user touches the viewing angle adjustment control on the touch display screen, and directly drags the viewing angle adjustment control;

second, the user touches the viewing angle adjustment control on the touch display screen with one finger, and slides on the touch display screen with another finger, so as to drag the viewing angle adjustment control; and third, the user touches the viewing angle adjustment control on the touch display screen, and presses a physical button on the terminal, to drag the viewing angle adjustment control.

The method for dragging the viewing angle adjustment control is not limited in this embodiment of this disclosure.

Optionally, a figure of the viewing angle adjustment control may be circular, square, diamond, elliptic, or irregular. The viewing angle adjustment control may alternatively display a pattern of small eye, like the viewing angle adjustment control 54 shown in FIG. 5, to indicate that the control is used for adjusting a viewing angle. A size of the viewing angle adjustment control may be fixed or may be customized according to a requirement of the user.

Optionally, the viewing angle adjustment control may be overlay-displayed on the right side or the left side of the viewing angle picture, or may be overlay-displayed on the upper side or the lower side of the viewing angle picture. This is not limited in this embodiment of this disclosure.

Optionally, the viewing angle adjustment control may partially overlap with other viewing angle controls in the user interface, or the viewing angle adjustment control may be set to not overlap with other controls in the user interface.

Step 403. Adjust the first viewing angle direction according to the drag instruction, to obtain a second viewing angle direction.

Optionally, both the first viewing angle direction and the second viewing angle direction are directions in which the virtual object is observed in the virtual environment.

Optionally, a method for adjusting the first viewing angle direction according to the drag instruction includes any one of the following methods:

first, the first viewing angle direction is a direction in which the virtual object is observed through a camera model in the virtual environment, and in this case, the camera model is adjusted according to the drag instruction; and second, the first viewing angle direction is a corresponding viewing angle direction when an environmental picture of the virtual environment is collected, and in this case, the environmental picture of the virtual environment is adjusted according to the drag instruction, and a picture outside the user interface is adjusted to be in the user interface according to the drag instruction.

Step 404. Display a second viewing angle picture, the second viewing angle picture being a picture of observing the virtual object in the second viewing angle direction in the virtual environment.

Optionally, the second viewing angle picture includes the virtual object having the first orientation.

Optionally, the viewing angle adjustment control is further overlay-displayed on the second viewing angle picture.

Figure 6:
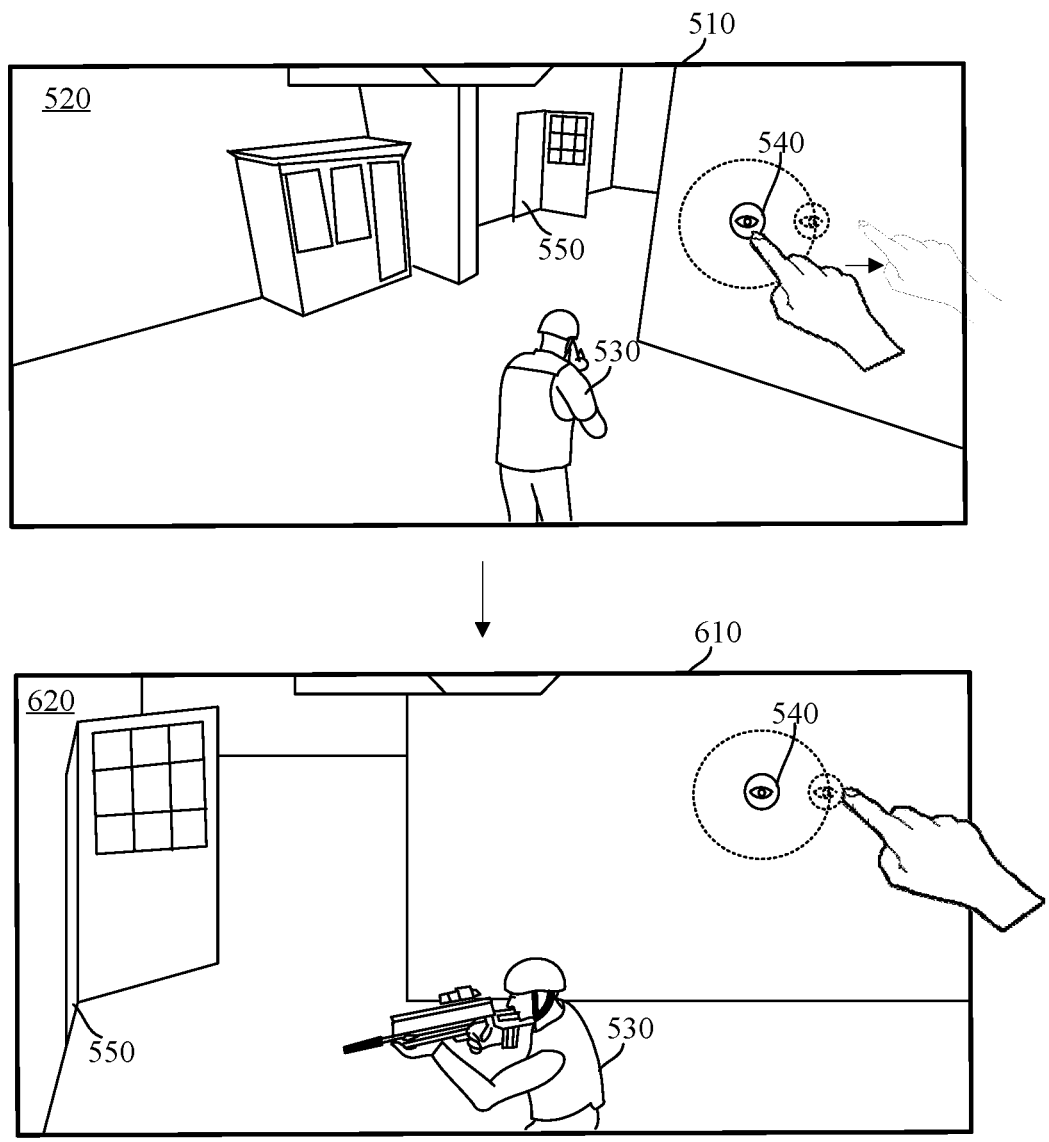
FIG. 6 is a schematic diagram of a user interface in the process of adjusting a viewing angle according to the embodiment shown in FIG. 4.

For example, referring to FIG. 6, after the user drags the viewing angle adjustment control 54 to the right in the user interface 510 shown in FIG. 5, and after the terminal receives the drag instruction for the viewing angle adjustment control, the terminal adjusts the first viewing angle direction to obtain a second viewing angle direction, and displays a second viewing angle picture 620 in a user interface 610. The second viewing angle picture 620 includes the foregoing virtual object 530 having a first orientation, the first orientation of the virtual object 530 is still facing the doorway 550 in the virtual environment. Optionally, the viewing angle adjustment control 54 is further overlay-displayed on the second viewing angle picture 620.

That the viewing angle direction is adjusted in this embodiment may be that the viewing angle direction is rotated in the virtual environment, or the viewing angle direction is translated in the virtual environment.

In summary, in the method for adjusting a viewing angle in a virtual environment provided in this embodiment, by setting a viewing angle adjustment control, when a user controls the viewing angle adjustment control on a first user interface, a viewing angle direction in which a virtual environment is observed may be adjusted without changing an orientation of a virtual object, that is, while the virtual object maintains an original orientation and an original movement posture, the user may observe other viewing angle directions of the virtual environment by controlling the viewing angle adjustment control. In other words, a travel direction of the virtual object in the virtual environment will not change because the user observes other viewing angle directions, thereby avoiding mutual influence between a viewing angle adjustment operation and a movement track of the virtual object.

Figure 7:
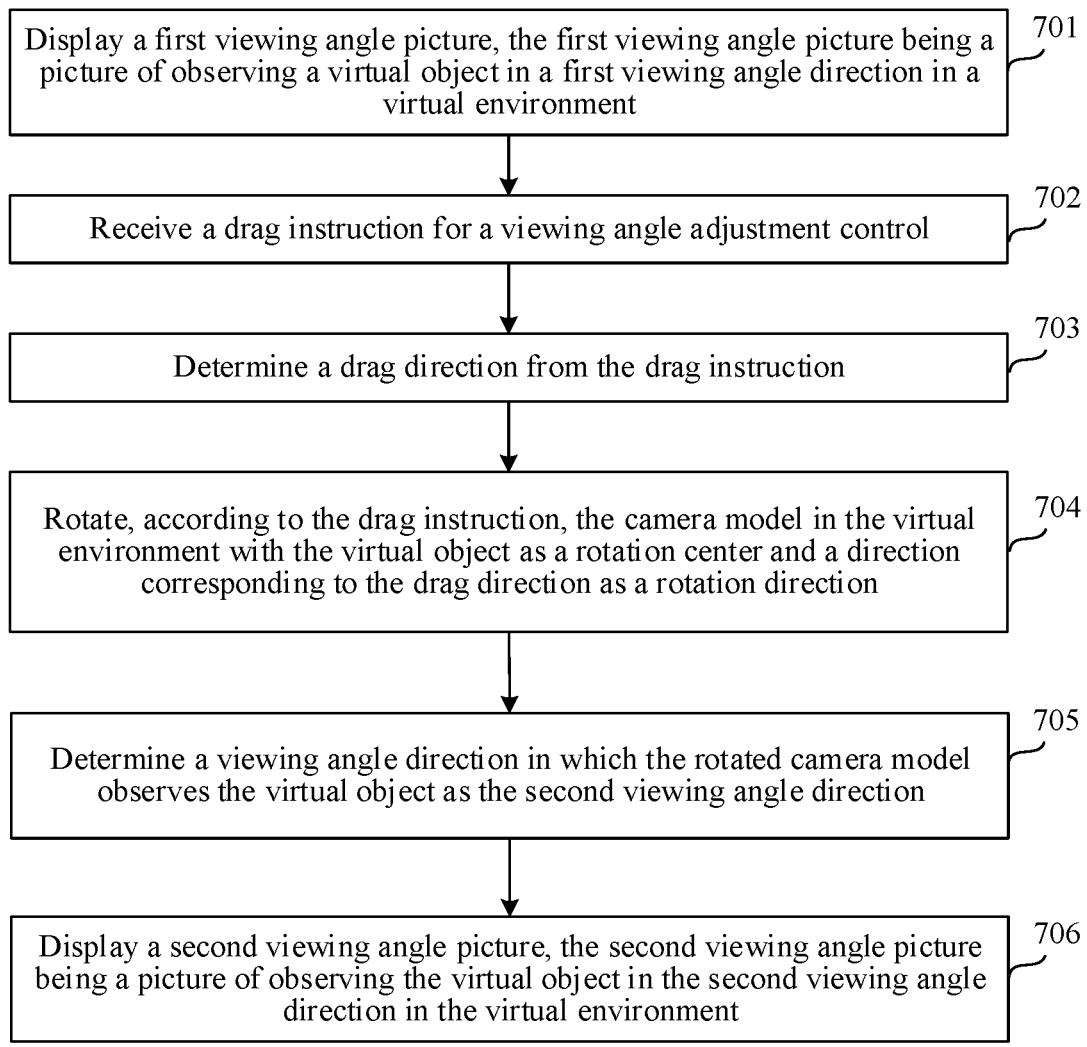
FIG. 7 is a flowchart of a method for adjusting a viewing angle in a virtual environment according to another exemplary embodiment of this disclosure.

In an optional embodiment, the first viewing angle direction is a direction in a case that a virtual object is observed through a camera model in a virtual environment. FIG. 7 is a flowchart of a method for adjusting a viewing angle in a virtual environment according to another exemplary embodiment of this disclosure. As shown in FIG. 7, the method for adjusting a viewing angle in a virtual environment includes the following steps:

Step 701. Display a first viewing angle picture, the first viewing angle picture being a picture of observing a virtual object in a first viewing angle direction in the virtual environment.

Optionally, the first viewing angle picture includes the virtual object having a first orientation, and a viewing angle adjustment control is further overlay-displayed on the first viewing angle picture.

Optionally, the first viewing angle direction is a direction in a case that a virtual object is observed through a camera model in a virtual environment. Optionally, the first viewing angle direction is a direction when the virtual object is observed by a camera model located behind the virtual object in the virtual environment, that is, a direction pointing to the virtual object from behind the virtual object.

Step 702. Receive a drag instruction for the viewing angle adjustment control.

Optionally, after the drag instruction is received, a locking operation may be further performed on the first orientation of the virtual object, the locking operation being used for controlling the first orientation of the virtual object from being changed.

Step 703. Determine a drag direction of the drag instruction.

Figure 8:
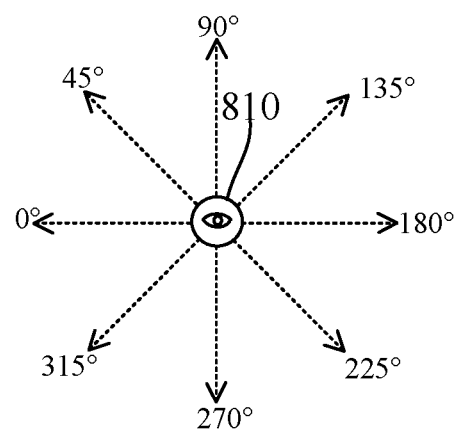
FIG. 8 is a schematic diagram of a drag direction according to the embodiment shown in FIG. 7.
Figure 9:
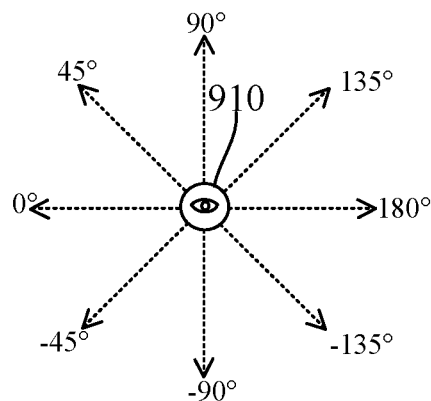
FIG. 9 is a schematic diagram of another drag direction according to the embodiment shown in FIG. 7.

Optionally, when dragging the viewing angle adjustment control, the user may drag the viewing angle adjustment control to any direction in a plane of the user interface. For example, referring to FIG. 8 and FIG. 9, FIG. 8 and FIG. 9 are two ways of determining a drag direction. In FIG. 8, a viewing angle adjustment control 810 is dragged to the left by 0°, and an angle is increased progressively clockwise to 360°. In FIG. 9, a viewing angle adjustment control 910 is dragged to the left by 0°, and an angle is increased progressively clockwise to 180°, or is decreased progressively counterclockwise to −180°.

Step 704. Rotate, according to the drag instruction, the camera model in the virtual environment with the virtual object as a rotation center and a direction corresponding to the drag direction as a rotation direction.

Optionally, the drag instruction is further used for indicating a drag distance, and the drag distance of the drag instruction is positively correlated to a rotation angle of the camera model during rotation.

Optionally, the rotation direction of the camera model corresponds to the drag direction. Description is made using an example in which the camera model rotates on a spherical surface with the rotation center as a sphere center. A circle corresponding to the drag direction and passing through the camera model is first made on the spherical surface according to the drag instruction, and the camera model is rotated clockwise or counterclockwise on the circle according to the drag instruction.

During rotation of the camera model in the virtual environment, the camera model is not only rotated, but also displaced due to rotation in the virtual environment.

Figure 10:
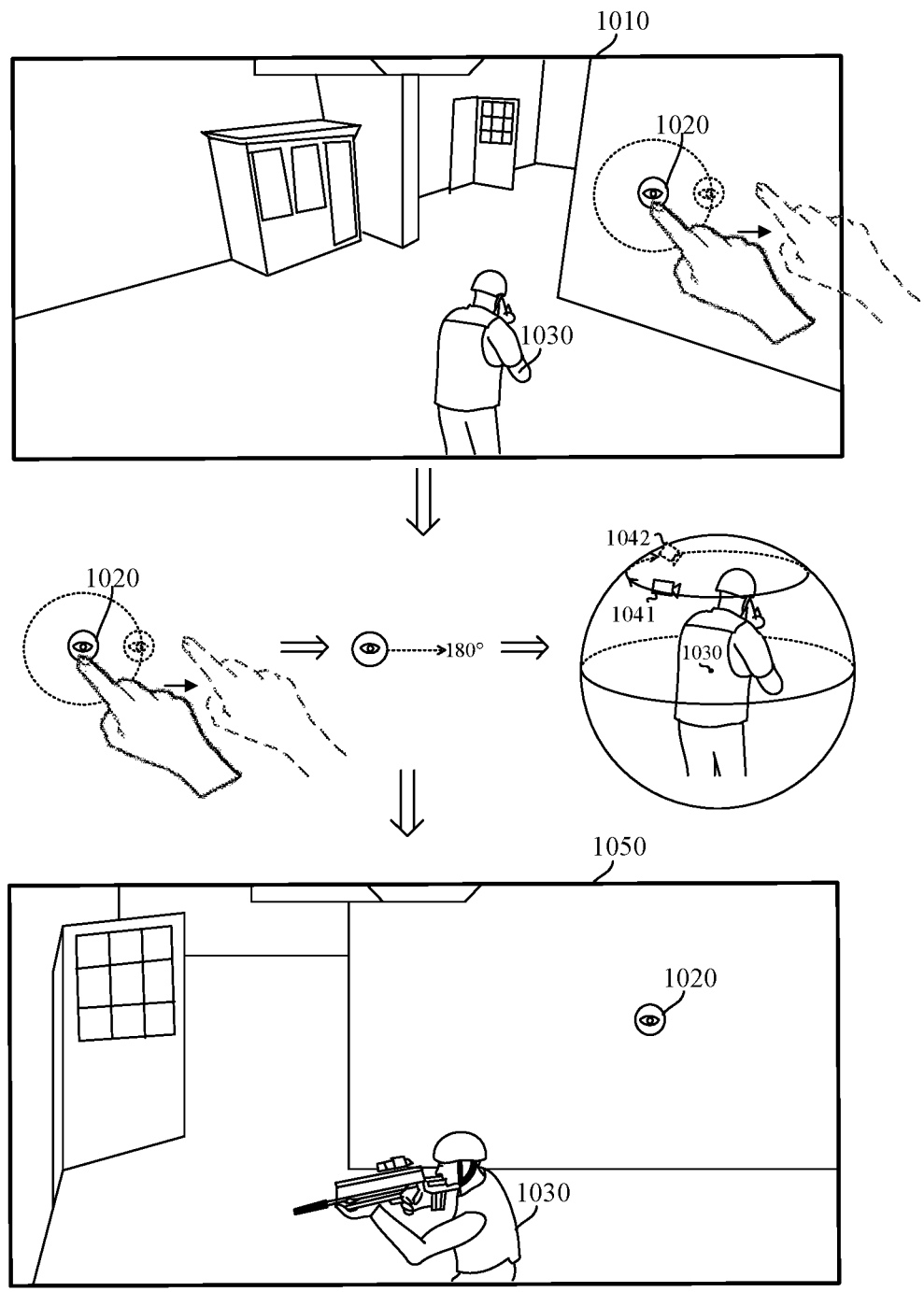
FIG. 10 is a schematic diagram of a correspondence between a viewing angle picture and a drag direction according to the embodiment shown in FIG. 7.

For example, referring to FIG. 10, FIG. 10 shows a specific example in which the camera model is rotated according to the drag instruction in this embodiment. As shown in FIG. 10, a user interface 1010 includes a viewing angle adjustment control 1020 and a virtual object 1030 having a first orientation. The user drags the viewing angle adjustment control 1020 to the right. It can be seen from FIG. 8 or FIG. 9 that, the user drags the viewing angle adjustment control 1020 to a 180° direction. Since the 180° direction corresponds to a horizontal direction in the virtual environment, a circle in the horizontal direction is made on a spherical surface on which a camera model 1041 is located. According to the 180° drag direction, the camera model 1041 is rotated clockwise along the circle, and a rotation angle is determined according to a drag distance. For example, for one unit of drag distance, the camera model 1041 is rotated by 15° along a rotation direction. In this embodiment, for example, the camera model 1041 is rotated to a position of a camera model 1042.

Step 705. Determine a viewing angle direction in which the virtual object is observed by the rotated camera model as the second viewing angle direction.

For example, it can be seen from FIG. 10 that, a viewing angle direction in which the virtual object 1030 is observed by the rotated camera model 1042 is determined as the second viewing angle direction.

Optionally, in a case of detecting that the camera model is obstructed during rotation, a viewing angle direction of the camera model where the camera model is obstructed is determined as the second viewing angle direction.

The camera model may be obstructed during rotation in at least one of the following situations:

First, the camera model is obstructed by viewing angle restriction determination during rotation. The viewing angle restriction determination may include detecting whether the virtual object is capable of observing a viewing angle direction obtained after rotation according to physical principles in the virtual environment. In a case of detecting that rotation of the camera model is obstructed by the viewing angle restriction determination during rotation, a viewing angle direction where the camera model is obstructed by the viewing angle restriction determination is determined as the second viewing angle direction.

Optionally, the viewing angle restriction determination may include that during rotation of the camera model, when the camera model is not obstructed by an obstacle, whether the virtual object is capable of observing a viewing angle direction obtained after rotation is detected. For example, during rotation of the camera model, the camera model is rotated from outside a window into the window to observe an interior of a room, and when the virtual object cannot observe the interior of the room at its position according to physical principles, it is considered that rotation of the camera model is obstructed by the viewing angle restriction determination during rotation.

Second, the camera model is obstructed by an obstacle during rotation, and the obstacle is a three-dimensional model in the virtual environment. In a case of detecting that the camera model is obstructed by an obstacle during rotation, the viewing angle direction when the camera model is obstructed by the obstacle is determined as the second viewing angle direction.

Optionally, whether the camera model is obstructed by an obstacle during rotation may be detected by performing collision detection in the virtual environment. Collision detection may be performed between objects in the virtual environment, for example, collision detection is performed according to a rotation path of the camera model, to determine whether the camera model will collide with an obstacle during rotation, so that when the camera model will collide with an obstacle during rotation, it is considered that the camera model is obstructed by the obstacle.

Step 706. Display a second viewing angle picture, the second viewing angle picture being a picture of observing the virtual object in the second viewing angle direction in the virtual environment.

Optionally, the second viewing angle picture includes the virtual object having the first orientation. Optionally, the viewing angle adjustment control is further overlay-displayed on the second viewing angle picture.

For example, in FIG. 10, as shown in a user interface 1050, the second viewing angle picture in a case that the virtual object is observed by the rotated camera model 1042 includes the virtual object 1030 having the first orientation, and the viewing angle adjustment control 1020 is further overlay-displayed on the second viewing angle picture.

Optionally, in this case, the viewing angle adjustment control 1020 is still in a drag state by the user. The drag state may be a state of pausing dragging, that is, the user continues to touch the viewing angle adjustment control 1020 but pauses dragging, or may be a state of keeping dragging.

Optionally, during transition from the first viewing angle picture to the second viewing angle picture, a third viewing angle picture is displayed, the third viewing angle picture being a picture of observing the virtual object in a transitional viewing angle direction in the process of adjusting the first viewing angle direction to the second viewing angle direction. The viewing angle adjustment control overlay-displayed on the third viewing angle picture is translated and displayed along the drag direction within a predetermined translation range according to the drag instruction. Referring to FIG. 10, the viewing angle adjustment control 1020 is translated and displayed within a predetermined translation range (within a dotted circular range framing the viewing angle adjustment control). For example, when the drag direction is to the right, the viewing angle adjustment control is translated to the right until it reaches an edge position of a virtual circle.

In summary, in the method for adjusting a viewing angle in a virtual environment provided in this embodiment, by setting a viewing angle adjustment control, when a user controls the viewing angle adjustment control on a first user interface, a viewing angle direction in which a virtual environment is observed may be adjusted without changing an orientation of a virtual object, that is, while the virtual object maintains an original orientation and an original movement posture, the user may observe other viewing angle directions of the virtual environment by controlling the viewing angle adjustment control. In other words, a travel direction of the virtual object in the virtual environment will not change because the user observes other viewing angle directions, thereby improving convenience of observing the virtual environment for the user.

In the method for adjusting a viewing angle in a virtual environment provided in this embodiment, the virtual object in the virtual environment is observed through the camera model, an orientation of the virtual object is separated from an observation direction of the virtual environment through the camera model, and the user may rotate the camera model by controlling the viewing angle adjustment control. Other viewing angle directions of the virtual environment are observed, thereby improving convenience of observing the virtual environment for the user.

Figure 11:
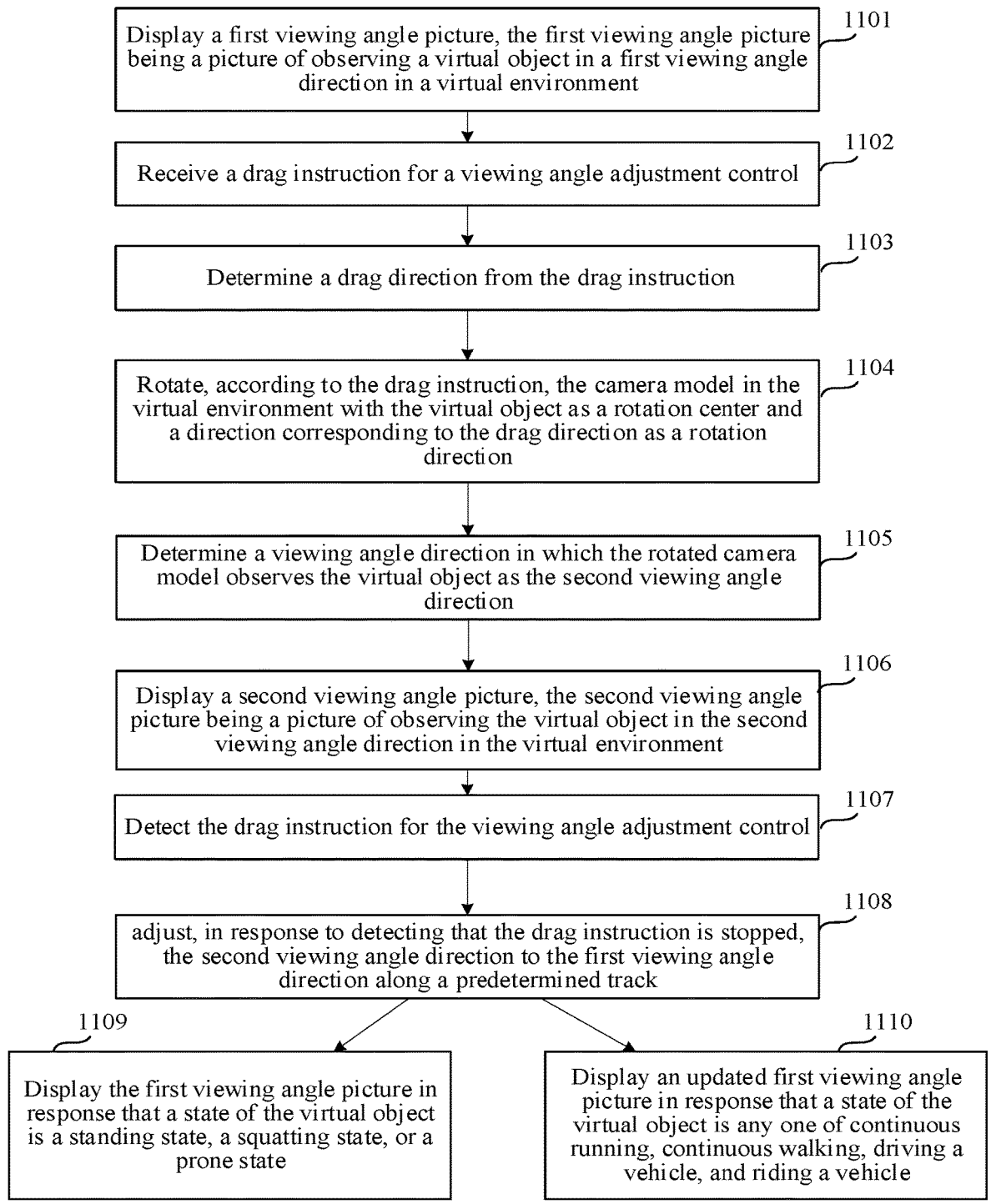
FIG. 11 is a flowchart of a method for adjusting a viewing angle in a virtual environment according to another exemplary embodiment of this disclosure.

In an optional embodiment, when detecting that the drag instruction is stopped, the terminal readjusts the second viewing angle direction to the first viewing angle direction. FIG. 11 is a flowchart of a method for adjusting a viewing angle in a virtual environment according to another exemplary embodiment of this disclosure. The method for adjusting a viewing angle in a virtual environment includes the following steps:

Step 1101. Display a first viewing angle picture, the first viewing angle picture being a picture of observing a virtual object in a first viewing angle direction in the virtual environment.

Optionally, the first viewing angle picture includes the virtual object having a first orientation, and a viewing angle adjustment control is further overlay-displayed on the first viewing angle picture.

Optionally, the first viewing angle direction is a direction in a case that a virtual object is observed through a camera model in a virtual environment. Optionally, the first viewing angle direction is a direction when the virtual object is observed by a camera model located behind the virtual object in the virtual environment, that is, a direction pointing to the virtual object from behind the virtual object.

Step 1102. Receive a drag instruction for the viewing angle adjustment control.

Optionally, after the drag instruction is received, a locking operation may be performed on the first orientation of the virtual object, the locking operation being used for controlling the first orientation of the virtual object from being changed.

Step 1103. Determine a drag direction of the drag instruction.

Optionally, when dragging the viewing angle adjustment control, the user may drag the viewing angle adjustment control to any direction in the plane of the user interface. Determining a drag direction of the drag instruction is specifically described in step 703, and details are not described herein again.

Step 1104. Rotate, according to the drag instruction, the camera model in the virtual environment with the virtual object as a rotation center and a direction corresponding to the drag direction as a rotation direction.

Optionally, the drag instruction is further used for indicating a drag distance, and the drag distance of the drag instruction is positively correlated to a rotation angle of the camera model during rotation.

Optionally, the rotation direction of the camera model corresponds to the drag direction. Description is made using an example in which the camera model rotates on a spherical surface with the rotation center as a sphere center. A circle corresponding to the drag direction and passing through the camera model is first made on the spherical surface according to the drag instruction, and the camera model is rotated clockwise or counterclockwise on the circle according to the drag instruction.

Step 1105. Determine a viewing angle direction in which the virtual object is observed by the rotated camera model as the second viewing angle direction.

Step 1106. Display a second viewing angle picture, the second viewing angle picture being a picture of observing the virtual object in the second viewing angle direction in the virtual environment.

Optionally, the second viewing angle picture includes the virtual object having the first orientation. Optionally, the viewing angle adjustment control is further overlay-displayed on the second viewing angle picture.

Step 1107. Detect the drag instruction for the viewing angle adjustment control.

Optionally, a state of the drag instruction may include: continuing the drag instruction, pausing the drag instruction, or stopping the drag instruction. The continuing the drag instruction represents that the user continues to drag the viewing angle adjustment control; the pausing the drag instruction represents that the user continues to touch (or press or click) the viewing angle adjustment control but pauses dragging the viewing angle adjustment control; and the stopping the drag instruction represents that the user stops touching (or pressing or clicking) the viewing angle adjustment control, and also stops dragging the viewing angle adjustment control.

Step 1108. Automatically adjust, in a case of detecting that the drag instruction is stopped, the second viewing angle direction to the first viewing angle direction along a predetermined track.

Optionally, a method for automatically adjusting the second viewing angle direction to the first viewing angle direction along a predetermined track includes at least any one of the following methods:

first, a rotation path when the first viewing angle direction is rotated to the second viewing angle direction is recorded, and the second viewing angle direction is rotated to the first viewing angle direction along the rotation path; and second, a shortest rotation path in which the second viewing angle direction is rotated to the first viewing angle direction is obtained, and the second viewing angle direction is rotated to the first viewing angle direction according to the shortest rotation path.

Adjusting the second viewing angle direction to the first viewing angle direction is rotating the camera model from a second position to a first position. The second position is a position when the camera model observes the virtual environment in the second viewing angle direction, and the first position is a position when the camera model observes the virtual environment in the first viewing angle direction.

Step 1109. Display the first viewing angle picture in a case that a state of the virtual object is a standing state, a squatting state, or a prone state.

In a case that a state of the virtual object is a standing state, a squatting state, or a prone state, neither of a position and an orientation of the virtual object in the virtual environment changes, so that after the second viewing angle direction is adjusted to the first viewing angle direction, the first viewing angle picture is displayed directly.

Step 1110. Display an updated first viewing angle picture in a case that a state of the virtual object is any one of continuous running, continuous walking, driving a vehicle, and riding a vehicle.

The updated first viewing angle picture is a picture updated to reflect movement of the virtual object in the virtual environment in a case that the virtual object is observed in the first viewing angle direction, and the updated first viewing angle picture includes the virtual object facing the first viewing angle direction. The virtual object may move in the virtual environment, and the position of the virtual object in the virtual environment may change, so that the first viewing angle picture will be updated as the position of the virtual object in the virtual environment changes.

In a case that a state of the virtual object is any one of continuous running, continuous walking, driving a vehicle, and riding a vehicle, the orientation of the virtual object in the virtual environment does not change, but the position of the virtual object in the virtual environment changes, so that after the second viewing angle direction is adjusted to the first viewing angle direction, the updated first viewing angle picture is displayed.

In summary, in the method for adjusting a viewing angle in a virtual environment provided in this embodiment, by setting a viewing angle adjustment control, when a user controls the viewing angle adjustment control on a first user interface, a viewing angle direction in which a virtual environment is observed may be adjusted without changing an orientation of a virtual object, that is, while the virtual object maintains an original orientation and an original movement posture, the user may observe other viewing angle directions of the virtual environment by controlling the viewing angle adjustment control. In other words, a travel direction of the virtual object in the virtual environment will not change because the user observes other viewing angle directions, thereby improving convenience of observing the virtual environment for the user.

In the method for adjusting a viewing angle in a virtual environment provided in this embodiment, the virtual object in the virtual environment is observed through the camera model, an orientation of the virtual object is separated from an observation direction of the virtual environment through the camera model, and the user may rotate the camera model by controlling the viewing angle adjustment control. Other viewing angle directions of the virtual environment are observed, thereby improving convenience of observing the virtual environment for the user.

In the method for adjusting a viewing angle in a virtual environment provided in this embodiment, when it is detected that the drag instruction is stopped, the second viewing angle direction is automatically adjusted to the first viewing angle direction along the predetermined track, and the user may restore the viewing angle direction to the first viewing angle direction by stopping dragging the viewing angle adjustment control or stopping touching the viewing angle adjustment control, thereby improving convenience of observing the virtual environment for the user.

Figure 12:
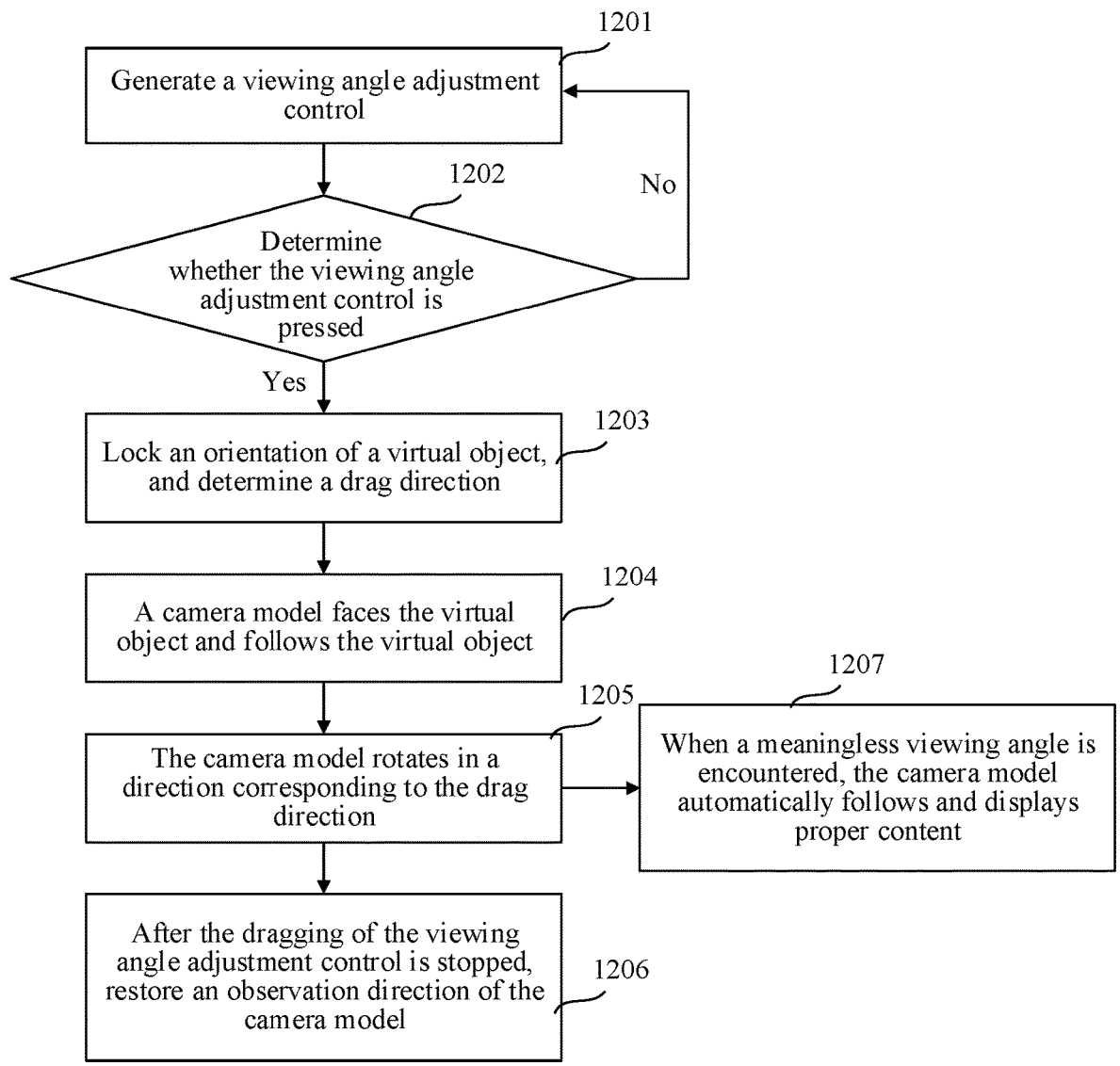
FIG. 12 is a flowchart of a method for adjusting a viewing angle in a virtual environment according to another exemplary embodiment of this disclosure.

FIG. 12 is a flowchart of a method for adjusting a viewing angle in a virtual environment according to another exemplary embodiment of this disclosure. The method for adjusting a viewing angle in a virtual environment includes the following steps:

Step 1201. Generate a viewing angle adjustment control.

A terminal first determines whether the viewing angle adjustment control in an application program is turned on, and when the viewing angle adjustment control is turned on, the terminal generates the viewing angle adjustment control and overlay-displays it on a viewing angle picture.

Step 1202. Determine whether the viewing angle adjustment control is pressed.

Step 1203. When the viewing angle adjustment control is pressed, lock an orientation of a virtual object, and determine a drag direction.

When the viewing angle adjustment control is pressed, it means that the user needs to observe other angles of the virtual environment while an existing orientation of the virtual object needs to be maintained, so that the orientation of the virtual object is locked, and the drag direction of the drag operation is determined.

Step 1204. A camera model faces the virtual object and follows the virtual object.

The camera model always maintains an angle to observe the virtual object and follows the virtual object, that is, when the virtual object is moving, the camera model follows the virtual object and rotates around the virtual object.

Step 1205. The camera model rotates in a direction corresponding to the drag direction.

The specific process of rotation is described in step 704, and details are not described herein again.

Step 1206. After the dragging of the viewing angle adjustment control is stopped, restore an observation direction of the camera model.

That is, the observation direction of the camera model is restored to an observation direction before the viewing angle adjustment control is pressed.

Step 1207. When a meaningless viewing angle is encountered, the camera model automatically follows and displays proper content.

During rotation of the camera model, whether a viewing angle obtained after rotation is a meaningless viewing angle is continuously detected, and the meaningless viewing angle is a viewing angle that cannot be reached by sight according to physical principles. When a viewing angle obtained after rotation is a meaningless viewing angle, the viewing angle of the camera model is controlled to not continue to rotate towards the meaningless viewing angle.

For example, the meaningless viewing angle may be a viewing angle when the camera model rotates into a wall, or a viewing angle when the camera model rotates into the ground, or a viewing angle when the camera model rotates into a window to observe a virtual environment in a room, and the virtual object cannot observe the virtual environment in the room at its position according to physical principles.

Figure 13:
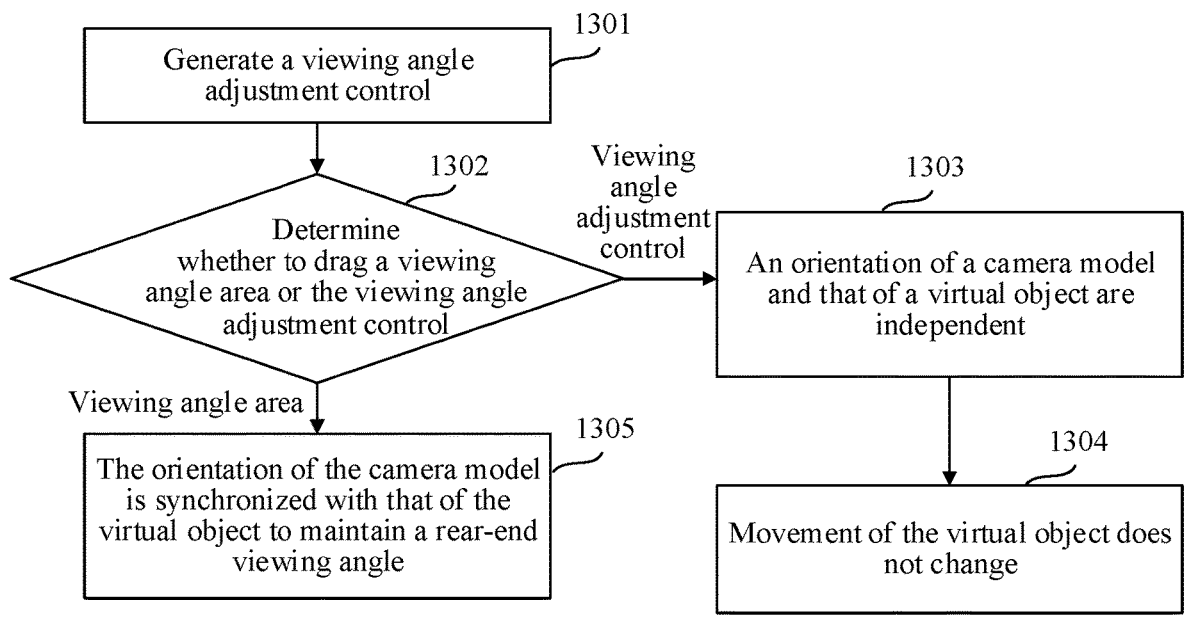
FIG. 13 is a flowchart of a method for adjusting a viewing angle in a virtual environment according to another exemplary embodiment of this disclosure.

Optionally, there are two operations performed in the user interface, as shown in FIG. 13. Step 1301. Generate a viewing angle adjustment control. Step 1302. Determine whether to drag a viewing angle area or the viewing angle adjustment control. Step 1303. When the viewing angle adjustment control is dragged, an orientation of a camera model and that of a virtual object are independent. Step 1304. Movement of the virtual object does not change. Step 1305. When the viewing angle area is dragged, the orientation of the camera model is synchronized with that of the virtual object to maintain a rear-end viewing angle.

That is, there are two conditions as follows: in one condition, the viewing angle area is dragged, and in the other condition, the viewing angle adjustment control is dragged:

First, the viewing angle area is dragged, that is, the viewing angle of the camera model is synchronized with the user's orientation. When the viewing angle is adjusted, the user turns around following the rotation of the camera model, and the camera model maintains a rear-end viewing angle on the virtual object. Optionally, the viewing angle area may be the left half or the right half of the user interface, or a predetermined area.

Second, the viewing angle adjustment control is dragged, the orientation of the camera model and that of the virtual object are independent, and the movement of the virtual object does not change.

Figure 14:
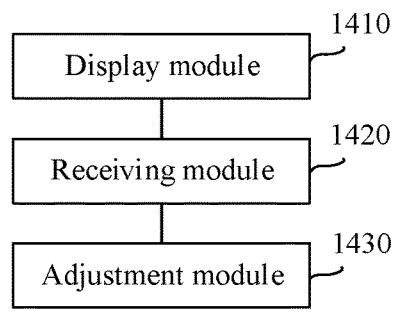
FIG. 14 is a structural block diagram of an apparatus for adjusting a viewing angle in a virtual environment according to an exemplary embodiment of this disclosure.

FIG. 14 is a structural block diagram of an apparatus for adjusting a viewing angle in a virtual environment according to an exemplary embodiment of this disclosure. The apparatus may be disposed in a terminal. The apparatus for adjusting a viewing angle in a virtual environment includes: a display module 1410, a receiving module 1420, and an adjustment module 1430, where the display module 1410 is configured to display a first viewing angle picture, the first viewing angle picture being a picture of observing a virtual object in a first viewing angle direction in the virtual environment, the first viewing angle picture including the virtual object having a first orientation, and a viewing angle adjustment control being further overlay-displayed on the first viewing angle picture;

the receiving module 1420 is configured to receive a drag instruction for the viewing angle adjustment control;

the adjustment module 1430 is configured to adjust the first viewing angle direction according to the drag instruction, to obtain a second viewing angle direction; and the display module 1410 is further configured to display a second viewing angle picture, the second viewing angle picture being a picture of observing the virtual object in the second viewing angle direction in the virtual environment, and the second viewing angle picture including the virtual object having the first orientation.

In an optional embodiment, the first viewing angle direction is a direction in a case that a virtual object is observed through a camera model in a virtual environment.

Figure 15:
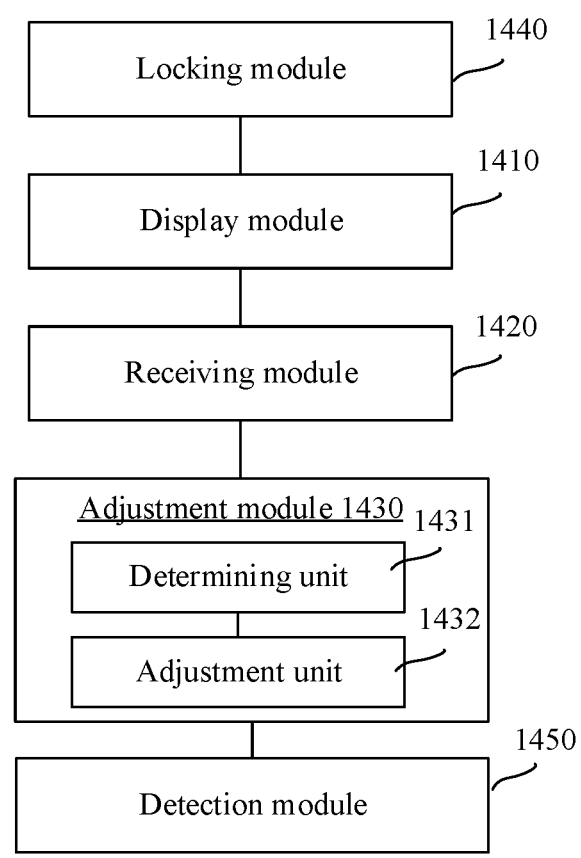
FIG. 15 is a structural block diagram of an apparatus for adjusting a viewing angle in a virtual environment according to another exemplary embodiment of this disclosure.

As shown in FIG. 15, the adjustment module 1430 includes:

a determining unit 1431, configured to determine a drag direction of the drag instruction; and an adjustment unit 1432, configured to rotate, according to the drag instruction, the camera model in the virtual environment with the virtual object as a rotation center and a direction corresponding to the drag direction as a rotation direction, the determining unit 1431 being further configured to determine a viewing angle direction in which the virtual object is observed by the rotated camera model as the second viewing angle direction.

In an optional embodiment, the determining unit 1431 is further configured to determine, in a case of detecting that the camera model is obstructed during rotation, a viewing angle direction in a case that the camera model is obstructed as the second viewing angle direction.

In an optional embodiment, the viewing angle direction in a case that the camera model is obstructed is a viewing angle direction in a case that the camera model is obstructed by viewing angle restriction determination, and the viewing angle restriction determination may include detecting whether the virtual object is capable of observing a viewing angle direction obtained after rotation according to physical principles in the virtual environment; and the determining unit 1431 is further configured to determine, in a case of detecting that rotation of the camera model is obstructed by the viewing angle restriction determination during rotation, a viewing angle direction in a case that the camera model is obstructed by the viewing angle restriction determination as the second viewing angle direction.

In an optional embodiment, the viewing angle direction in a case that the camera model is obstructed is a viewing angle direction in a case that the camera model is obstructed by an obstacle; and the determining unit 1431 is further configured to determine, in a case of detecting that the camera model is obstructed by an obstacle during rotation, the viewing angle direction in a case that the camera model is obstructed by the obstacle as the second viewing angle direction.

In an optional embodiment, the apparatus further includes:

a locking module 1440, configured to perform a locking operation on the first orientation of the virtual object, the locking operation being used for controlling the first orientation of the virtual object from being changed.

In an optional embodiment, the apparatus further includes:

a detection module 1450, configured to detect the drag instruction for the viewing angle adjustment control, the adjustment module 1430 being further configured to automatically adjust, in a case of detecting that the drag instruction is stopped, the second viewing angle direction to the first viewing angle direction along a predetermined track; and the display module 1410 being further configured to display the first viewing angle picture in a case that a state of the virtual object is a standing state, a squatting state, or a prone state.

In an optional embodiment, the apparatus further includes:

a detection module 1450, configured to detect a control signal for the viewing angle adjustment control, the adjustment module 1430 being further configured to adjust, in a case of detecting that the control signal is stopped, the second viewing angle direction to the first viewing angle direction along a predetermined track; and the display module 1410 being further configured to display an updated first viewing angle picture in a case that a state of the virtual object is any one of continuous running, continuous walking, driving a vehicle, and riding a vehicle, the updated first viewing angle picture being a picture updated to reflect movement of the virtual object in the virtual environment in a case that the virtual object is observed in the first viewing angle direction, and the updated first viewing angle picture including the virtual object facing the first viewing angle direction.

In an optional embodiment, the display module 1410 is further configured to display a third viewing angle picture, the third viewing angle picture being a picture of observing the virtual object in a transitional viewing angle direction in the process of adjusting the first viewing angle direction to the second viewing angle direction; and translate and display, according to the drag instruction, the viewing angle adjustment control overlay-displayed on the third viewing angle picture along the drag direction within a predetermined translation range.

Figure 16:
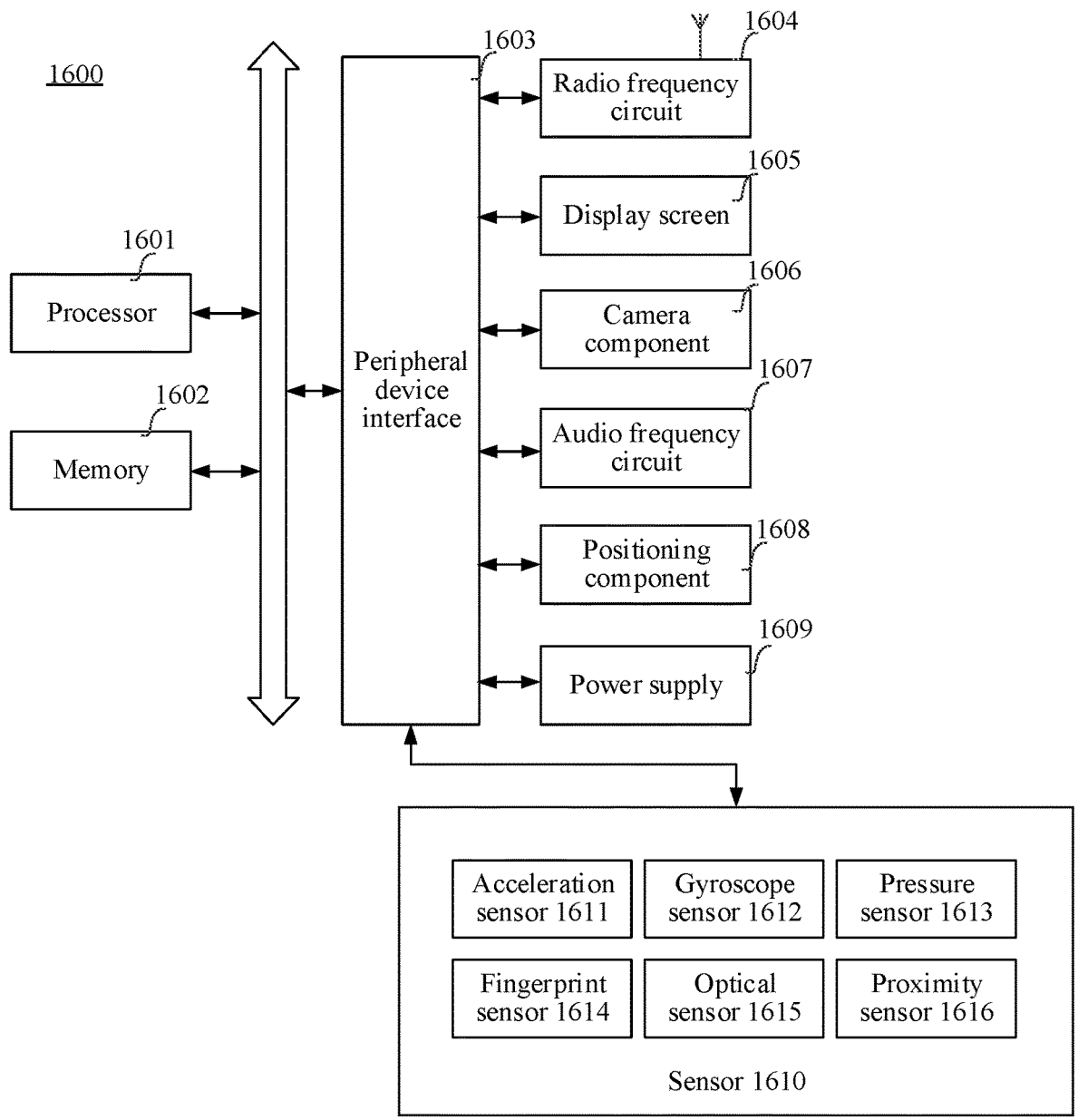
FIG. 16 is a structural block diagram of a terminal according to an exemplary embodiment of this disclosure.

FIG. 16 shows a structural block diagram of a terminal 1600 according to an exemplary embodiment of the disclosure. The terminal 1600 may be a smartphone, a tablet computer, a moving picture experts group audio layer III (MP3) player, a moving picture experts group audio layer IV (MP4) player, a notebook computer, or a desktop computer. The terminal 1600 may also be referred to as another name such as user equipment, a portable terminal, a laptop terminal, or a desktop terminal.

Generally, the terminal 1600 includes a processor 1601 and a memory 1602.

The processor 1601 includes one or more processing cores, for example, a 4-core processor or an 8-core processor. The processor 1601 may be implemented by at least one hardware form of a digital signal processor (DSP), a field-programmable gate array (FPGA), and a programmable logic array (PLA). The processor 1601 may alternatively include a main processor and a coprocessor. The main processor is configured to process data in an awake state, also referred to as a central processing unit (CPU), and the coprocessor is a low-power processor configured to process data in an idle state. In some embodiments, the processor 1601 may be integrated with a graphics processing unit (GPU). The GPU is responsible for rendering and drawing content to be displayed by a display screen. In some embodiments, the processor 1601 may further include an artificial intelligence (AI) processor. The AI processor is configured to process a calculation operation related to machine learning.

The memory 1602 may include one or more computer-readable storage media. The computer-readable storage media may be non-transient. The memory 1602 may further include a high-speed random access memory, and a non-volatile memory such as one or more magnetic disk storage devices and a flash memory device. In some embodiments, the non-transient computer-readable storage medium in the memory 1602 is configured to store at least one instruction. The at least one instruction is executed by the processor 1601 to perform the method for adjusting a viewing angle in a virtual environment provided in the method embodiment of this disclosure.

In some embodiments, the terminal 1600 may further optionally include a peripheral device interface 1603 and at least one peripheral device. The processor 1601, the memory 1602, and the peripheral device interface 1603 may be connected through a bus or a signal cable. Each peripheral device may be connected to the peripheral device interface 1603 through a bus, a signal cable, or a circuit board. Specifically, the peripheral device includes: at least one of a radio frequency (RF) circuit 1604, a touch display screen 1605, a camera component 1606, an audio frequency circuit 1607, a positioning component 1608, and a power supply 1609.

The peripheral device interface 1603 may be configured to connect at least one peripheral device related to input/output (I/O) to the processor 1601 and the memory 1602. In some embodiments, the processor 1601, the memory 1602, and the peripheral device interface 1603 are integrated into the same chip or circuit board. In some other embodiments, any one or two of the processor 1601, the memory 1602, and the peripheral device interface 1603 may be implemented on an independent chip or circuit board, and the implementation is not limited in this embodiment.

The radio frequency circuit 1604 is configured to receive and transmit a radio frequency (RF) signal, also referred to as an electromagnetic signal. The radio frequency circuit 1604 communicates with a communications network and another communications device using the electromagnetic signal. The radio frequency circuit 1604 may convert an electric signal into an electromagnetic signal for transmission, or convert a received electromagnetic signal into an electric signal. Optionally, the radio frequency circuit 1604 includes an antenna system, an RF transceiver, one or more amplifiers, a tuner, an oscillator, a digital signal processor, a codec chip set, a subscriber identity module card, and the like. The radio frequency circuit 1604 may communicate with another terminal using a wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1604 may further include a circuit related to near field communication (NFC). This is not limited in this disclosure.

The display screen 1605 is configured to display a user interface (UI). The UI may include a graph, text, an icon, a video, and any combination thereof. In a case that the display screen 1605 is a touch display screen, the display screen 1605 is further capable of collecting a touch signal on or over a surface of the display screen 1605. The touch signal may be inputted into the processor 1601 as a control signal for processing. In this case, the display screen 1605 may be further configured to provide a virtual button and/or a virtual keyboard, also referred to as a soft button and/or a soft keyboard. In some embodiments, there is one display screen 1605, disposed on a front panel of the terminal 1600. In some other embodiments, there may be two display screens 1605, respectively disposed on different surfaces of the terminal 1600 or designed in a foldable shape. In still some other embodiments, the display screen 1605 may be a flexible display screen, disposed on a curved surface or a folded surface of the terminal 1600. Even, the display screen 1605 may be further set to have a non-rectangular irregular graph, that is, a special-shaped screen. The display screen 1605 may be manufactured using a material such as a liquid crystal display (LCD), an organic light-emitting diode (OLED), or the like.

The camera component 1606 is configured to collect an image or a video. Optionally, the camera component 1606 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1606 may further include a flash. The flash may be a monochrome temperature flash, or may be a double color temperature flash. The double color temperature flash refers to a combination of a warm flash and a cold flash, and may be configured to perform light ray compensation at different color temperatures.

The audio frequency circuit 1607 may include a microphone and a loudspeaker. The loudspeaker is configured to collect sound waves of a user and an environment, and convert the sound waves into electric signals and input the electrical signals into the processor 1601 for processing, or input the electrical signals into the radio frequency circuit 1604 to implement speech communication. For the purpose of stereo sound collection or noise reduction, there may be a plurality of microphones, respectively disposed at different parts of the terminal 1600. The microphone may be further a microphone array or an omnidirectional collection microphone. The loudspeaker is configured to convert electric signals from the processor 1601 or the radio frequency circuit 1604 into sound waves. The loudspeaker may be a conventional thin-film loudspeaker or a piezoelectric ceramic loudspeaker. When the loudspeaker is the piezoelectric ceramic loudspeaker, electric signals not only can be converted into sound waves that can be heard by human, but also can be converted into sound waves that cannot be heard by human for ranging and the like. In some embodiments, the audio frequency circuit 1607 may further include an earphone jack.

The positioning component 1608 is configured to position a current geographic location of the terminal 1600, to implement a navigation or a location based service (LBS). The positioning component 1608 may be a positioning component based on the global positioning system (GPS) of the United States, the Beidou system of China, or the Galileo system of Russia.

The power supply 1609 is configured to supply power to components in the terminal 1600. The power supply 1609 may be an alternating current, a direct current, a primary battery, or a rechargeable battery. In a case that the power supply 1609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 1600 further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

The acceleration sensor 1611 may detect acceleration on three coordinate axes of a coordinate system established by the terminal 1600. For example, the acceleration sensor 1611 may be configured to detect components of gravity acceleration on the three coordinate axes. The processor 1601 may control, according to a gravity acceleration signal collected by the acceleration sensor 1611, the display screen 1605 to display the user interface in a frame view or a portrait view. The acceleration sensor 1611 may be further configured to collect motion data of a game or a user.

The gyroscope sensor 1612 may detect a body direction and a rotation angle of the terminal 1600. The gyroscope sensor 1612 may cooperate with the acceleration sensor 1611 to collect a 3D action by the user on the terminal 1600. The processor 1601 may implement the following functions according to the data collected by the gyroscope sensor 1612: motion sensing (such as changing the UI according to a tilt operation of the user), image stabilization at shooting, game control, and inertial navigation.

The pressure sensor 1613 may be disposed at a side frame of the terminal 1600 and/or a lower layer of the touch display screen 1605. When the pressure sensor 1613 is disposed on the side frame of the terminal 1600, a holding signal of the user on the terminal 1600 may be detected. The processor 1601 performs left and right hand recognition or a quick operation according to the holding signal collected by the pressure sensor 1613. When the pressure sensor 1613 is disposed on the low layer of the display screen 1605, the processor 1601 controls, according to a pressure operation of the user on the display screen 1605, an operable control on the UI. The operable control includes at least one of a button control, a scroll bar control, an icon control, and a menu control.

The fingerprint sensor 1614 is configured to collect a fingerprint of the user. The processor 1601 identifies an identity of the user according to the fingerprint collected by the fingerprint sensor 1614, or the fingerprint sensor 1614 identifies an identity of the user according to the collected fingerprint. In a case that the identity of the user is identified as a trusted identity, the processor 1601 authorizes the user to perform a related sensitive operation. The sensitive operation includes unlocking a screen, viewing encrypted information, downloading software, payment, changing settings, and the like. The fingerprint sensor 1614 may be disposed on a front face, a back face, or a side face of the terminal 1600. When a physical button or a vendor logo is disposed on the terminal 1600, the fingerprint 1614 may be integrated with the physical button or the vendor logo.

The optical sensor 1615 is configured to collect ambient light intensity. In an embodiment, the processor 1601 may control display luminance of the display screen 1605 according to the ambient light intensity collected by the optical sensor 1615. Specifically, in a case that the ambient light intensity is relatively high, the display luminance of the display screen 1605 is increased. In a case that the ambient light intensity is relatively low, the display luminance of the display screen 1605 is reduced. In another embodiment, the processor 1601 may further dynamically adjust shooting parameters of the camera component 1606 according to the ambient light intensity collected by the optical sensor 1615.

The proximity sensor 1616, also referred to as a distance sensor, is usually disposed on the front panel of the terminal 1600. The proximity sensor 1616 is configured to collect a distance between a front face of the user and the front face of the terminal 1600. In an embodiment, when the proximity sensor 1616 detects that the distance between the front face of the user and the front face of the terminal 1600 is gradually decreased, the processor 1601 controls the display screen 1605 to switch from a screen-on state to a screen-off state. When the proximity sensor 1616 detects that the distance between the front face of the user and the front face of the terminal 1600 is gradually increased, the processor 1601 controls the display screen 1605 to switch from the screen-off state to the screen-on state.

A person skilled in the art may understand that a structure shown in FIG. 16 constitutes no limitation on the terminal 1600, and the terminal may include more or fewer components than those shown in the figure, or some components may be combined, or a different component deployment may be used.

A person of ordinary skill in the art may understand that all or some of the steps of the methods in the embodiments may be implemented by a program instructing relevant hardware. The program may be stored in a computer-readable storage medium. The computer-readable storage medium may be a computer-readable storage medium included in the memory in the foregoing embodiment; or may be a computer-readable storage medium that exists independently and is not assembled in the terminal. The computer-readable storage medium stores at least one instruction, at least one program, a code set or an instruction set, and the at least one instruction, the at least one program, the code set or the instruction set is loaded and executed by a processor to implement the method for adjusting a viewing angle in a virtual environment according to any one of FIG. 1 to FIG. 10.

Optionally, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this disclosure are merely for description purpose, and do not indicate the preference among the embodiments.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A method for adjusting a viewing angle in a virtual environment, comprising:
    displaying a first viewing angle picture, the first viewing angle picture being a picture of observing a virtual object in a first viewing angle direction in the virtual environment, the first viewing angle picture comprising the virtual object having a first orientation, and a viewing angle adjustment control being overlay-displayed on the first viewing angle picture, wherein the first viewing angle direction is a direction in which a camera model observes the virtual object in the virtual environment;
    receiving a drag instruction for the viewing angle adjustment control;
    adjusting the first viewing angle direction according to the drag instruction, to obtain a second viewing angle direction by:
        determining a drag direction from the drag instruction,
        making a circle corresponding to the drag direction and passing through the camera model on a spherical surface according to the drag instruction,
        rotating, according to the drag instruction, the camera model in the virtual environment along the circle with the virtual object as a rotation center and a direction corresponding to the drag direction as a rotation direction, wherein a distance between the camera model and the rotation center remains unchanged during rotation, and
        determining a viewing angle direction in which the rotated camera model observes the virtual object as the second viewing angle direction; and
    displaying a second viewing angle picture, the second viewing angle picture being a picture of observing the virtual object in the second viewing angle direction in the virtual environment, and the second viewing angle picture comprising the virtual object having the first orientation.

2. The method of claim 1, wherein the method further comprises
    determining a drag distance from the drag instruction; and
    the rotating the camera model comprises:
        rotating, according to the drag instruction, the camera model with the direction corresponding to the drag direction as the rotation direction and a rotation angle positively correlated to the drag distance.

3. The method of claim 2, wherein determining the viewing angle direction in which the rotated camera model observes the virtual object as the second viewing angle direction comprises:
    in response to detecting that the camera model is obstructed during rotation, determining a viewing angle direction where the camera model is obstructed as the second viewing angle direction.

4. The method of claim 3, wherein determining the viewing angle direction where the camera model is obstructed as the second viewing angle direction comprises:
in response to detecting that rotation of the camera model is obstructed by a viewing angle restriction determination, determining a viewing angle direction where the camera model is obstructed by the viewing angle restriction determination as the second viewing angle direction,
wherein the viewing angle restriction determination comprises detecting whether the virtual object is capable of observing in a viewing angle direction obtained during rotation according to physical principles in the virtual environment.

5. The method of claim 3, wherein determining the viewing angle direction where the camera model is obstructed as the second viewing angle direction comprises:
in response to detecting that the camera model is obstructed by an obstacle during rotation, determining the viewing angle direction where the camera model is obstructed by the obstacle as the second viewing angle direction.

6. The method of claim 1, wherein subsequent to receiving the drag instruction, the method further comprises:
performing a locking operation on the first orientation of the virtual object, the locking operation preventing the first orientation of the virtual object from being changed.

7. The method of claim 1, wherein subsequent to displaying the second viewing angle picture, the method further comprises:
detecting the drag instruction for the viewing angle adjustment control; and
in response to the drag instruction being stopped, adjusting the second viewing angle direction to the first viewing angle direction along a predetermined track.

8. The method of claim 7, wherein subsequent to adjusting the second viewing angle direction to the first viewing angle direction, the method further comprises:
displaying the first viewing angle picture in response to a state of the virtual object being a standing state, a squatting state, or a prone state.

9. The method of claim 7, wherein subsequent to adjusting the second viewing angle direction to the first viewing angle direction, the method further comprises:
in response to a state of the virtual object being continuous running, continuous walking, driving a vehicle, or riding a vehicle,
updating the first viewing angle picture of observing the virtual object in the first viewing angle direction to reflect movement of the virtual object in the virtual environment, the first viewing angle picture comprising the virtual object facing the first viewing angle direction, and
displaying the updated first viewing angle picture.

10. The method of claim 1, wherein subsequent to receiving the drag instruction for the viewing angle adjustment control, the method further comprises:
displaying a third viewing angle picture, the third viewing angle picture being a picture of observing the virtual object in a transitional viewing angle direction in a process of adjusting the first viewing angle direction to the second viewing angle direction; and
translating, according to the drag instruction, the viewing angle adjustment control overlay-displayed on the third viewing angle picture along the drag direction within a predetermined translation range.

11. An apparatus for adjusting a viewing angle in a virtual environment, comprising:
a memory operable to store program code; and
a processor operable to read the program code and configured to:
display a first viewing angle picture, the first viewing angle picture being a picture of observing a virtual object in a first viewing angle direction in the virtual environment, the first viewing angle picture comprising the virtual object having a first orientation, and a viewing angle adjustment control being overlay-displayed on the first viewing angle picture, wherein the first viewing angle direction is a direction in which a camera model observes the virtual object in the virtual environment;
receive a drag instruction for the viewing angle adjustment control;
adjust the first viewing angle direction according to the drag instruction, to obtain a second viewing angle direction by:
determining a drag direction from the drag instruction,
making a circle corresponding to the drag direction and passing through the cameral model on a spherical surface according to the drag instruction,
rotating, according to the drag instruction, the camera model in the virtual environment along the circle with the virtual object as a rotation center and a direction corresponding to the drag direction as a rotation direction, wherein a distance between the camera model and the rotation center remains unchanged during rotation, and
determining a viewing angle direction in which the rotated camera model observes the virtual object as the second viewing angle direction; and
display a second viewing angle picture, the second viewing angle picture being a picture of observing the virtual object in the second viewing angle direction in the virtual environment, and the second viewing angle picture comprising the virtual object having the first orientation.

12. The apparatus of claim 11, wherein the processor is further configured to, in response to detecting that the camera model is obstructed during rotation, determine a viewing angle direction where the camera model is obstructed as the second viewing angle direction.

13. The apparatus of claim 12, wherein the processor is further configured to, in response to detecting that rotation of the camera model is obstructed by a viewing angle restriction determination, determine a viewing angle direction where the camera model is obstructed by the viewing angle restriction determination as the second viewing angle direction,
wherein the viewing angle restriction determination comprises detecting whether the virtual object is capable of observing in a viewing angle direction obtained during rotation according to physical principles in the virtual environment.

14. The apparatus of claim 12, wherein that the camera model is obstructed comprises the camera model is obstructed by an obstacle; and
the processor is further configured to, in response to detecting that the camera model is obstructed by an obstacle during rotation, determine the viewing angle direction where the camera model is obstructed by the obstacle as the second viewing angle direction.

15. The apparatus of claim 11, wherein the processor is further configured to:

perform a locking operation on the first orientation of the virtual object, the locking operation preventing the first orientation of the virtual object from being changed.

16. The apparatus of claim 11, wherein the processor is further configured to:
   detect the drag instruction for the viewing angle adjustment control;
   in response to detecting that the drag instruction is stopped, adjust the second viewing angle direction to the first viewing angle direction along a predetermined track; and
   display the first viewing angle picture in response to a state of the virtual object is a standing state, a squatting state, or a prone state.

17. The apparatus of claim 11, wherein the processor is further configured to:
   detect a control signal for the viewing angle adjustment control;
   in response to detecting that the control signal is stopped, adjust the second viewing angle direction to the first viewing angle direction along a predetermined track; and
   in response to a state of the virtual object being continuous running, continuous walking, driving a vehicle, or riding a vehicle,
      update the first viewing angle picture of observing the virtual object in the first viewing angle direction to reflect movement of the virtual object in the virtual environment, the first viewing angle picture comprising the virtual object facing the first viewing angle direction, and
      display the updated first viewing angle picture.

18. The apparatus of claim 11, wherein the processor is further configured to:
   display a third viewing angle picture, the third viewing angle picture being a picture of observing the virtual object in a transitional viewing angle direction in a process of adjusting the first viewing angle direction to the second viewing angle direction; and
   translate, according to the drag instruction, the viewing angle adjustment control overlay-displayed on the third viewing angle picture along the drag direction within a predetermined translation range.

19. A non-transitory machine-readable medium comprising machine-readable instructions for adjusting a viewing angle in a virtual environment, the machine-readable instructions comprising instructions that, when executed, cause a machine to:
   display a first viewing angle picture, the first viewing angle picture being a picture of observing a virtual object in a first viewing angle direction in a virtual environment, the first viewing angle picture comprising the virtual object having a first orientation, and a viewing angle adjustment control being overlay-displayed on the first viewing angle picture, wherein the first viewing angle direction is a direction in which a camera model observes the virtual object in the virtual environment;
   receive a drag instruction for the viewing angle adjustment control;
   adjust the first viewing angle direction according to the drag instruction, to obtain a second viewing angle direction by:
      determining a drag direction from the drag instruction, making a circle corresponding to the drag direction and passing through the cameral model on a spherical surface according to the drag instruction,
      rotating, according to the drag instruction, the camera model in the virtual environment along the circle with the virtual object as a rotation center and a direction corresponding to the drag direction as a rotation direction, wherein a distance between the camera model and the rotation center remains unchanged during rotation, and
      determining a viewing angle direction in which the rotated camera model observes the virtual object as the second viewing angle direction; and
   display a second viewing angle picture, the second viewing angle picture being a picture observing the virtual object in the second viewing angle direction in the virtual environment, and the second viewing angle picture comprising the virtual object having the first orientation.

* * * * *